United States Patent
Yagi

(10) Patent No.: US 9,894,241 B2
(45) Date of Patent: Feb. 13, 2018

(54) PRINTING APPARATUS AND CONTROL METHOD FOR PRINTING APPARATUS FOR CONTROLLING AN INTERFACE CONFIGURATION

(71) Applicant: CANON KABUSHIKI KAISHA, Tokyo (JP)

(72) Inventor: Yuichi Yagi, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/369,679

(22) Filed: Dec. 5, 2016

(65) Prior Publication Data

US 2017/0163844 A1 Jun. 8, 2017

(30) Foreign Application Priority Data

Dec. 7, 2015 (JP) .................................. 2015-238782

(51) Int. Cl.
*H04N 1/00* (2006.01)
*H04N 1/32* (2006.01)

(52) U.S. Cl.
CPC ....... *H04N 1/32593* (2013.01); *H04N 1/0097* (2013.01); *H04N 1/00474* (2013.01); *H04N 1/00965* (2013.01); *H04N 2201/0046* (2013.01); *H04N 2201/0062* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,791,745 B2* | 9/2010 | Nakata | .................. | G06F 3/1203 358/1.13 |
| 8,363,257 B2* | 1/2013 | Higuchi | ................ | G06F 3/1204 346/107.3 |
| 9,584,679 B2* | 2/2017 | Nishida | .............. | H04N 1/00244 |
| 2005/0060447 A1* | 3/2005 | Tanaka | .................. | G09G 5/006 710/62 |
| 2006/0005016 A1* | 1/2006 | Lee | ........................... | G06F 8/63 713/164 |
| 2007/0016714 A1* | 1/2007 | Huotari | .................. | H04L 67/34 710/313 |
| 2008/0094655 A1* | 4/2008 | Nagai | .................. | G06F 21/608 358/1.15 |
| 2011/0179083 A1* | 7/2011 | Galloway | ............. | G06F 13/385 707/783 |
| 2012/0198219 A1* | 8/2012 | Preimesberger | ...... | G06F 9/4411 713/2 |
| 2013/0204929 A1* | 8/2013 | Yoshida | ............ | H04L 29/06047 709/203 |

(Continued)

FOREIGN PATENT DOCUMENTS

JP 2005-078304 A 3/2005

*Primary Examiner* — Ming Hon
(74) *Attorney, Agent, or Firm* — Canon U.S.A., Inc. IP Division

(57) ABSTRACT

A printing apparatus including a USB interface displays a selection screen for a user to select an OS type of an information processing apparatus that communicates via the USB interface when the printing apparatus starts up. The printing apparatus determines a configuration of the USB interface based on the OS type selected on the selection screen.

8 Claims, 17 Drawing Sheets

(56) References Cited

U.S. PATENT DOCUMENTS

| | | | |
|---|---|---|---|
| 2013/0337868 A1* | 12/2013 | Dang | G06F 9/441 |
| | | | 455/558 |
| 2014/0139877 A1* | 5/2014 | Ohara | G06F 3/1293 |
| | | | 358/1.15 |
| 2017/0094107 A1* | 3/2017 | Kadota | H04N 1/00042 |

* cited by examiner

SETTING FOR CONNECTION TO PC VIA USB NEEDS TO BE DETERMINED. ON NEXT SCREEN, PLEASE SELECT SETTING ACCORDING TO ENVIRONMENT OF PC TO BE CONNECTED VIA USB.

SELECT 3 DRIVERS TO BE USED

- [✓] PDL DRIVER — 721
- [✓] SCAN DRIVER — 722
- [ ] FAX DRIVER — 723
- [✓] IPP DRIVER (GENERAL-PURPOSE DRIVER) — 724

[ OK ] — 725

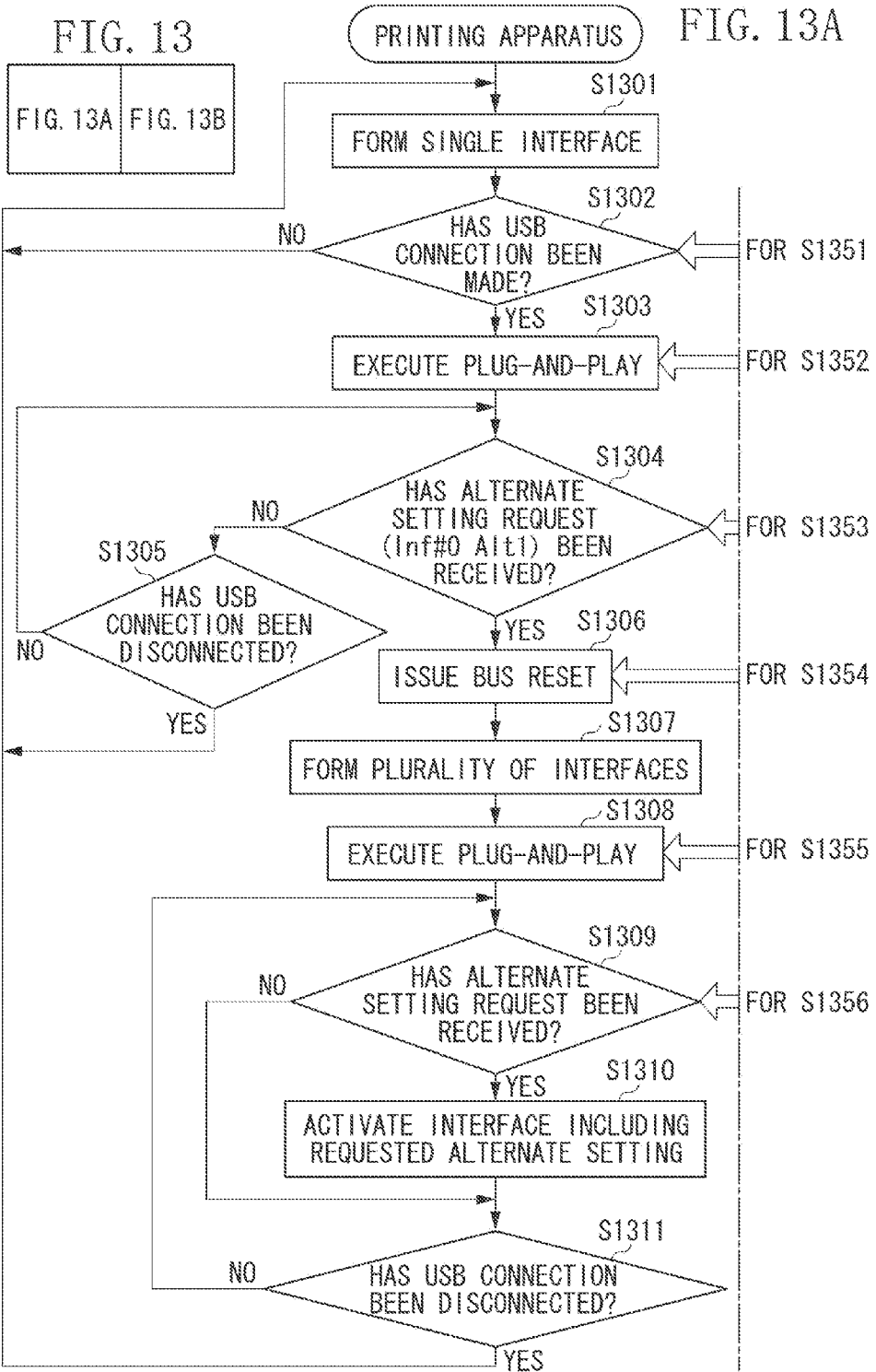

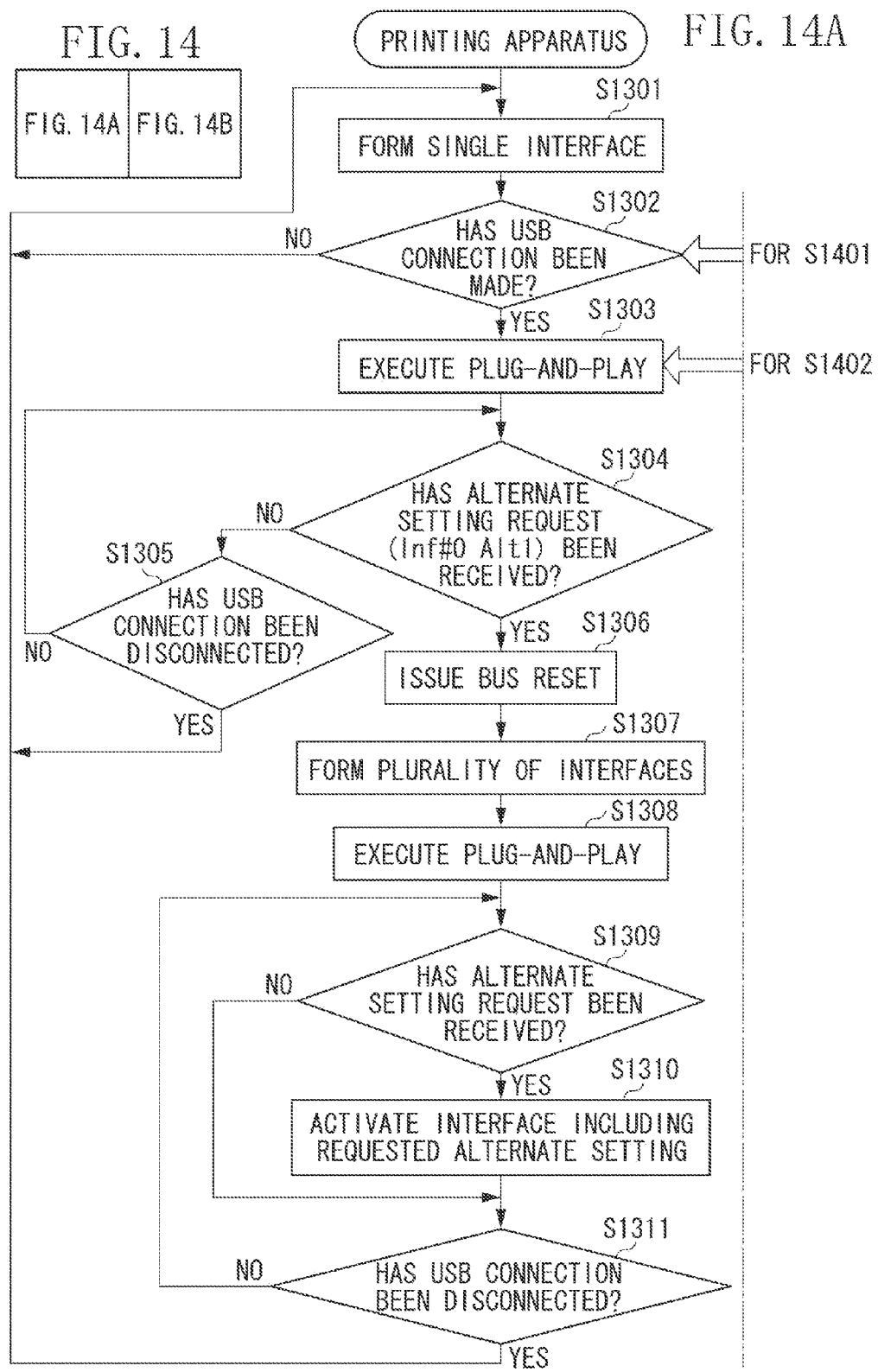

PRINTING APPARATUS AND CONTROL METHOD FOR PRINTING APPARATUS FOR CONTROLLING AN INTERFACE CONFIGURATION

BACKGROUND OF THE INVENTION

Field of the Invention

The present invention relates to a printing apparatus including a universal serial bus (USB) interface and to a control method for the printing apparatus.

Description of the Related Art

Conventionally, a printing system in which a printing apparatus and a computer (hereinafter referred to as a personal computer (PC)) serving as one example of an information processing apparatus are connected is available. In such a printing system, the PC transmits print data described in a language such as a page description language (PDL) to the printing apparatus, and the printing apparatus executes printing based on the print data. The PDL is a print data language interpretable by the printing apparatus. Moreover, examples of such printing apparatuses include a multifunction peripheral including a scanning function of reading an image. Such a type of the multifunction peripheral may employ a composite universal serial bus (composite USB) that enables a plurality of functions to be installed in the multifunctional peripheral without using a USB hub. Moreover, when the multifunctional peripheral employing the composite USB is connected to a PC via a USB cable, Plug-and-Play is executed. This sequentially forms interfaces for various functions installed in the multifunctional peripheral. Hereinafter, a printer and a multifunctional peripheral are collectively called a printing apparatus.

When the USB connection is made, Plug-and-Play is executed. Herein, a device driver for controlling an interface of the printing apparatus may not be installed on the PC. In such a case, the PC recognizes the printing apparatus as an unknown apparatus. In this case, an operating system (OS) of the PC displays on a monitor a message indicating that an installation failure has occurred at Plug-and-Play.

Meanwhile, some related-art OSs include device drivers. Such a device driver installed on the OS is provided to correspond to a type or version of the OS by a printing apparatus vendor. Hereinafter, a device driver provided by the printing apparatus vendor is referred to as "a vendor driver". In addition, with recent advances in PC technology, new OSs have been introduced one after another. Even an OS with a general-purpose device driver (hereinafter referred to as a general-purpose driver) installed as default has been introduced. In this case, as long as the printing apparatus includes an interface corresponding to the general-purpose driver, the PC can perform printing and scanning via the printing apparatus as similar to the case of the vendor driver.

Further, Japanese Patent Application Laid-Open No. 2005-78304 discusses a technique by which USB descriptors retained by a printing apparatus can be switched. In an apparatus discussed in Japanese Patent Application Laid-Open No. 2005-78304, the printing apparatus transmits the current USB descriptor in response to a descriptor reading request from a PC. If the PC does not start communication according to the current USB descriptor within a predetermined time after the current USB descriptor was transmitted, the apparatus discussed in Japanese Patent Application Laid-Open No. 2005-78304 switches the USB descriptors retained therein.

As described above, when the PC in which the OS with the general-purpose driver installed as default is in operation is connected to the printing apparatus including an interface corresponding to the general-purpose driver, the PC controls the interface of the printing apparatus using the general-purpose driver of the OS to control printing. However, for example, when a PC in which an OS without a general-purpose driver is in operation is connected to the printing apparatus including an interface for the general-purpose driver, a driver installation failure could occur at Plug-and-Play.

SUMMARY OF THE INVENTION

According to an aspect of the present invention, a printing apparatus includes a printer, a USB interface, a memory configured to store instructions, and a processor configured to execute the instructions to display a selection screen on which a user selects an OS type of an information processing apparatus that communicates with the printing apparatus via the USB interface, and to determine an interface configuration of the USB interface based on the OS type selected on the selection screen.

Further features of the present invention will become apparent from the following description of exemplary embodiments with reference to the attached drawings.

BRIEF DESCRIPTION OF THE DRAWINGS

FIGS. 7A and 7B are diagrams illustrating examples of screens displayed by a printing apparatus according to a second exemplary embodiment.

DESCRIPTION OF THE EMBODIMENTS

Hereinafter, exemplary embodiments of the present invention are described with reference to the drawings.

Figure 1:
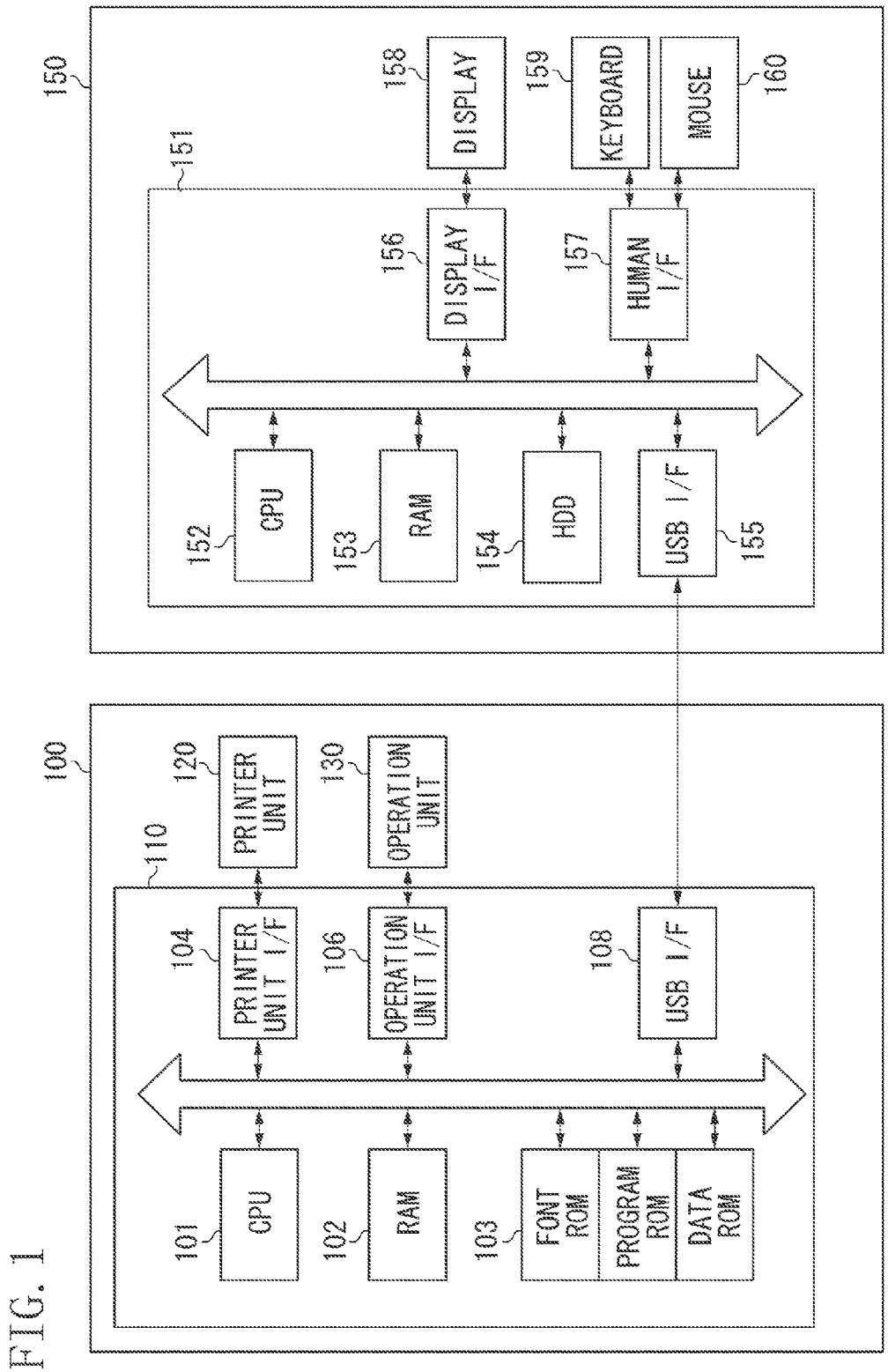
FIG. 1 is a schematic diagram illustrating examples of hardware configurations of a printing apparatus and a computer.

A first exemplary embodiment is described using an example in which a USB interface is formed after a user selects whether to use a general-purpose driver. FIG. 1 is a diagram illustrating examples of hardware configurations a printing apparatus 100 of the first exemplary embodiment and a computer 150 (hereinafter referred to as a PC 150) as one example of an information processing apparatus. The PC 150 is a communication partner that communicates with the printing apparatus 100 via USB connection.

In FIG. 1, the printing apparatus 100 includes a printer unit 120, an operation unit 130, and a controller unit 110 for controlling the printer unit 120 and the operation unit 130. The controller unit 110 includes a central processing unit (CPU) 101 that comprehensively controls each block of the printing apparatus 100 by executing various control programs. The CPU 101 reads the various control programs stored in a program area of a read only memory (ROM) 103 to execute such control programs. In the ROM 103, the various control programs may be stored in a compressed manner. In such a case, the compressed control program is decompressed and loaded to a random access memory (RAM) 102, so that the CPU 101 executes the decompressed control program. The various control programs can be stored in a non-volatile medium such as a hard disk drive (HDD) (not illustrated), for example, in a compressed state or non-compressed state. Moreover, the CPU 101 decompresses compressed data stored in a data area of the ROM 103, and loads the decompressed data to the RAM 102, thereby using such decompressed data in various types of processing. A printer unit interface (I/F) 104 functions as an interface that outputs an image signal to the printer unit 120 (a printer engine). The CPU 101 uses font information stored in a font area of the ROM 103 to display an image including a character and/or a symbol on a screen of a display panel of the operation unit 130 via an operation unit I/F 106. The operation unit 130 includes, for example, a display panel and a touch panel. When a user issues an instruction using the operation unit 130, the CPU 101 receives such instruction information from the operation unit 130 via the operation unit I/F 106. A USB I/F 108 communicates with the PC 150 as the information processing apparatus of the communication partner via a USB cable according to communication control by the CPU 101.

The PC 150 includes a display 158, a keyboard 159, a mouse 160, and a controller unit 151 that controls each of these units. The controller unit 151 includes a CPU 152 that executes various control programs to comprehensively control each block of the PC 150. For example, the CPU 152 reads a control program stored in a program area of an HDD 154 to execute the control program. In the HDD 154, various control programs may be stored in a compressed manner. In such a case, the compressed program is decompressed and loaded to a RAM 153, so that the CPU 152 executes the decompressed program. Moreover, the CPU 152 decompresses compressed data stored in a data area of the HDD 154, and loads the decompressed data to the RAM 153, thereby using such decompressed data in various types of processing. The CPU 152 uses font information stored in a font area of the HDD 154 to display a character and/or a symbol on the display 158 via a display I/F 156. Moreover, when the user issues an instruction using the keyboard 159 or the mouse 160, the CPU 152 receives such instruction information from the keyboard 159 or the mouse 160 via a human I/F 157. A USB I/F 155 communicates with the printing apparatus 100 via the USB cable according to communication control by the CPU 152.

Figure 2:
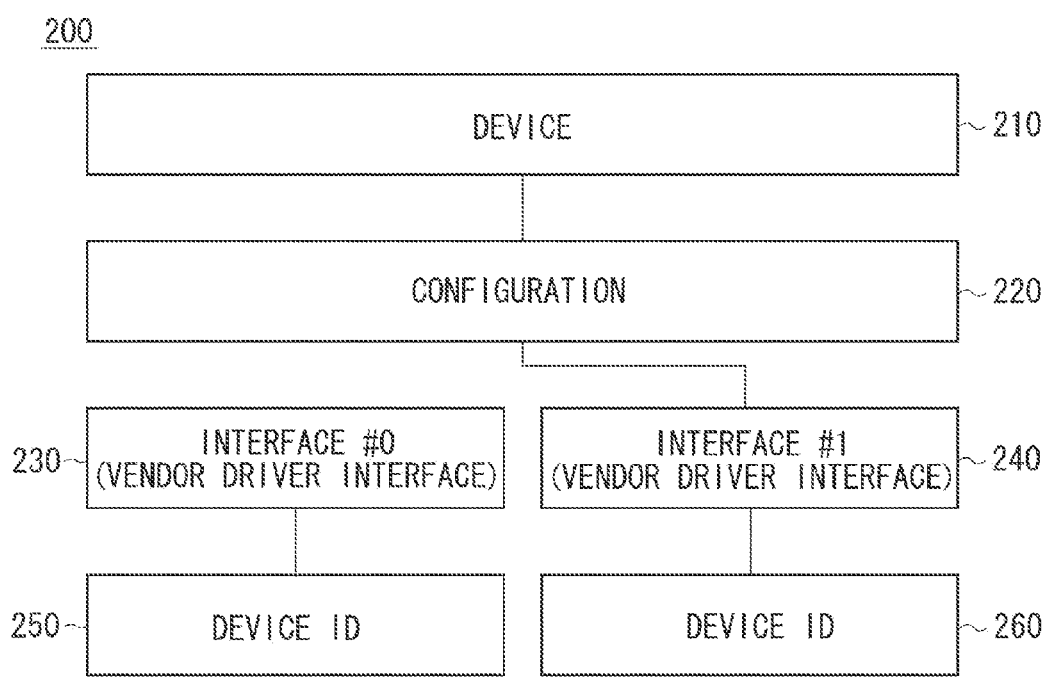
FIG. 2 is a diagram illustrating a descriptor for a single interface.

FIG. 2 is a diagram illustrating one example a USB descriptor 200 retained by the printing apparatus 100 of the first exemplary embodiment. The USB descriptor 200 is used to form a single interface for a vendor driver (a device driver provided by a printing apparatus vendor). In FIG. 2, the USB descriptor 200 includes a device descriptor 210, a configuration descriptor 220, and interface descriptors 230 and 240. The device descriptor 210 is used for notification of a vendor identification (ID) and a product ID. The configuration descriptor 220 is used for notification of an interface configuration selectable by the printing apparatus 100. Each of the interface descriptors 230 and 240 serves as a descriptor of an interface (hereinafter referred to as a vendor driver interface) communicable with a vendor driver. Moreover, in FIG. 2, each of a device ID 250 and a device ID 260 identifies a device defined by Institute of Electrical and Electronics Engineers (IEEE) 1284.

Establishment of connection between the printing apparatus 100 and the PC 150 using Plug-and-Play is described. In the PC 150 used herein, assume that software (hereinafter referred to as an installer) for installing a driver has previously been executed according to an instruction from a user, for example, and a vendor driver has been installed. The installer has been acquired from media such as a compact disc-read-only memory (CD-ROM) or the Internet.

When the USB connection is made to the printing apparatus 100 in a state that the vendor driver is installed on the PC 150 as described above, the PC 150 executes Plug-and-Play. In Plug-and-Play, the PC 150 acquires the device IDs 250 and 260 of the USB descriptor 200 from the printing apparatus 100 to determine whether the acquired information corresponds to the vendor driver already installed. If the acquired information corresponds to the installed vendor driver, the PC 150 establishes the USB connection between the PC 150 and the printing apparatus 100. This enables the printing apparatus 100 to execute printing according to print data from the PC 150.

Figure 3:
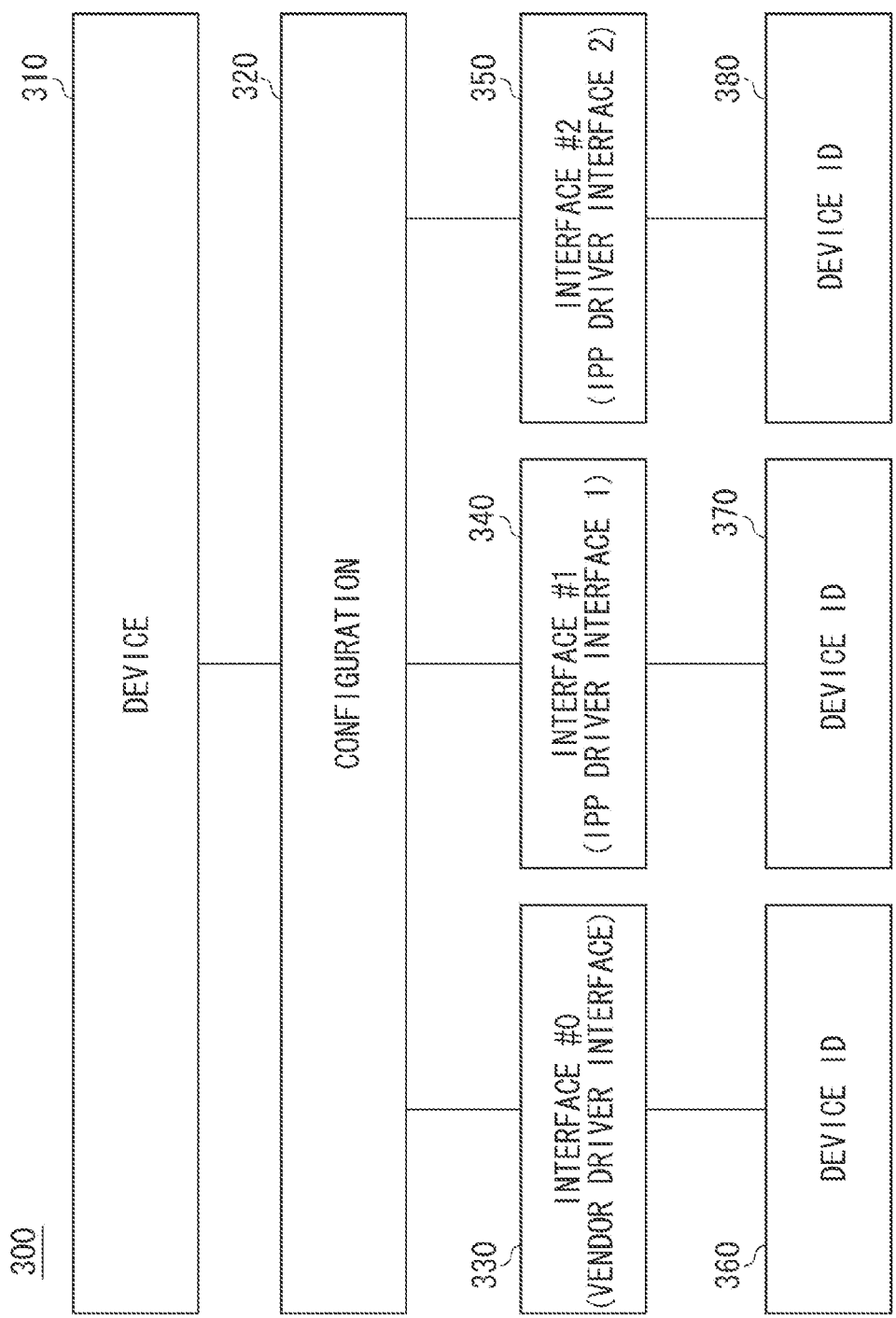
FIG. 3 is a diagram illustrating a descriptor for a plurality of interfaces.

FIG. 3 is a diagram illustrating one example of a USB descriptor 300 retained by the printing apparatus 100 of the first exemplary embodiment. The USB descriptor 300 illustrated in FIG. 3 is used to form a plurality of interfaces for a vendor driver and a general-purpose driver. In the present exemplary embodiment. Internet printing protocol (IPP) over USB is described as an example of the general-purpose driver. The IPP over USB driver serving as the general-purpose driver is installed as default an the PC. Accordingly, unlike the case of the vendor driver, the user does not need to execute an installer for installing a driver on the PC 150. In FIG. 3, the USB descriptor 300 includes a device descriptor 310, a configuration descriptor 320, and interface descriptors 330, 340 and 350. The device descriptor 310 is used for not of a vendor ID and a product ID. The configuration descriptor 320 is used for notification of an interface configuration selectable by the printing apparatus 100. The interface descriptor 330 serves as a descriptor of an interface communicable with the vendor driver. Each of the interface descriptors 340 and 350 serves as a descriptor of an interface (hereinafter referred to as an IPP driver interface) communicable with an IPP driver. Moreover, in FIG. 3, each of a device ID 360, a device ID 370, and a device ID 380 identifies a device defined by IEEE 1284.

When the USB connection is made to the printing apparatus 100, the PC 150 executes Plug-and-Play. In Plug-and-Play, the PC 150 acquires the device IDs 370 and 380 of the USB descriptor 300 from the printing apparatus 100 to determine whether the acquired information corresponds to the driver already installed. If the acquired information corresponds to the installed driver, the PC 150 establishes the USB connection between the PC 150 and the printing apparatus 100. Accordingly, the PC 150 enables the printing apparatus 100 to execute printing.

Since the present exemplary embodiment is described using an example of the printing apparatus 100, that is, a USB printer class, the device ID is acquired in Plug-and-Play. However, the present exemplary embodiment can be applied to a case where Plug-and-Play is executed without acquisition of the device ID, for example, a case where a USB vendor class is used.

Figure 4:
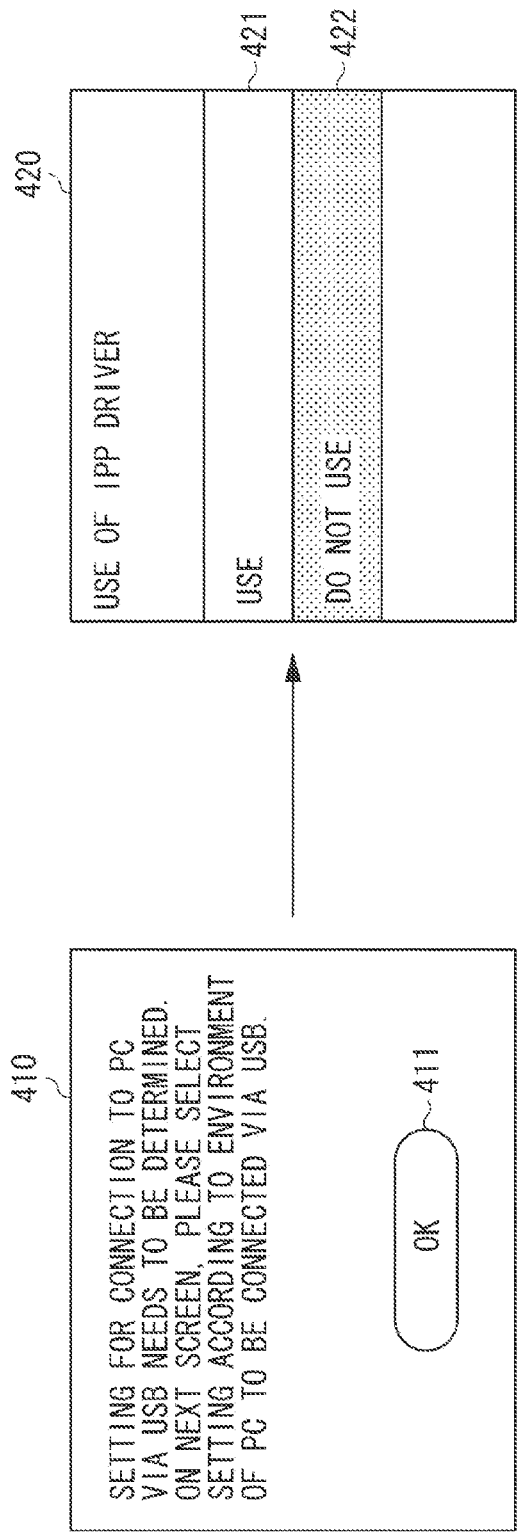
FIGS. 4A and 4B are diagrams illustrating examples of screens displayed by the printing apparatus according to a first exemplary embodiment.

Each of FIGS. 4A and 4B is a diagram illustrating one example of a display screen on a display panel of the operation unit 130 of the printing apparatus 100 according to the first exemplary embodiment. When the printing apparatus 100 starts up, an initial setting may not be performed. In such a case, the CPU 101 generates a video signal of an explanation screen 410 as illustrated in FIG. 4A to display the explanation screen 410 on the display panel of the operation unit 130. The explanation screen 410 explains a setting content for the initial setting to the user. When the user touches (presses) an OK button 411 displayed on the explanation screen 410, the CPU 101 generates a video signal of an IPP driver use selection screen 420 as illustrated in FIG. 4B to display the IPP driver use selection screen 420 on the display panel of the operation unit 130. The IPP driver use selection screen 420 allows the user to select whether to use an IPP driver. For example, the IPP driver use selection screen 420 includes an item "USB" 421 that is selected if the IPP driver is used, and an item "DO NOT USB" 422 that is selected if the IPP driver is not used. The CPU 101 receives a result of the selection made by the user from the IPP driver use selection screen 420 via a touch panel of the operation unit 130. For example, if the user selects the item. "USB" 421, the CPU 101 forms a USB interface using the USB descriptor 300 for formation of the interfaces for the vendor driver and the general-purpose driver illustrated in FIG. 3. On the other hand, for example, if the user selects the item "DO NOT USB" 422, the CPU 101 forms a USB interface using the USB descriptor 200 for formation of only the vendor driver interface illustrated in FIG. 2. The IPP driver use selection screen 420 can be displayed on a user setting screen (not illustrated).

Figure 5:
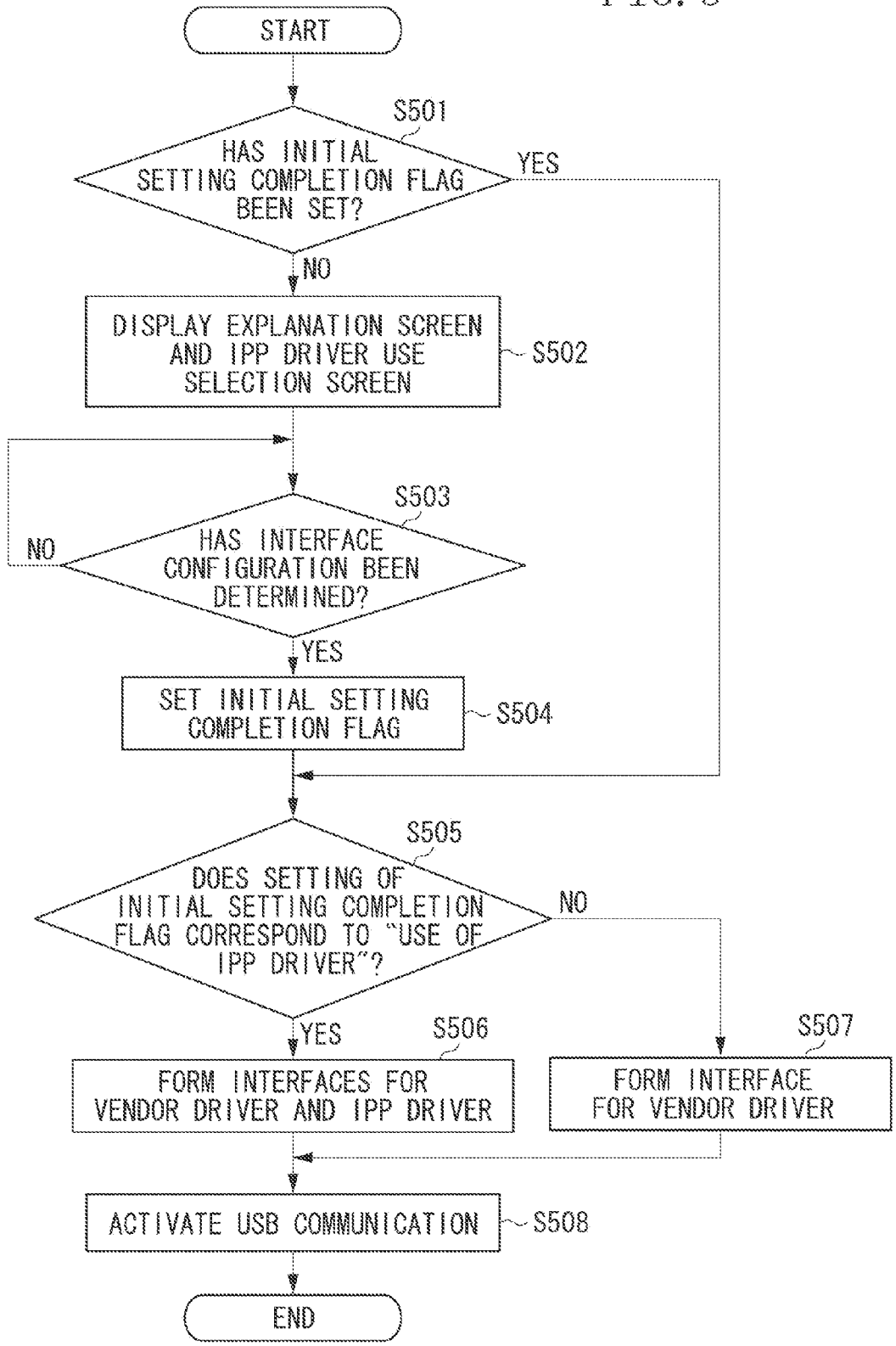
FIG. 5 is a flowchart illustrating processing performed by the printing apparatus according to the first exemplary embodiment.

FIG. 5 is a flowchart illustrating processing performed between connection of the printing apparatus 100 of the first exemplary embodiment to the PC 150 via a USB cable and activation of USB communication. The control program to be executed by the CPU 101 of the printing apparatus 100 is stored in the ROM 103. The CPU 101 loads the control program stored in the ROM 103 to the RAM 102, and executes the loaded control program to perform each of steps S501 through S508 illustrated in FIG. 5.

In step S501, when the printing apparatus 100 of the first exemplary embodiment is connected to the PC 150 via a USB cable, the CPU 101 of the printing apparatus 100 determines whether an initial setting completion flag has been set. If the CPU 101 determines that the initial setting completion flag has already been set (YES in step S501), the processing proceeds to step S505. On the other hand, if the CPU 101 determines that the initial setting completion flag has not been set (NO in step S501), the processing proceeds to step S502. In step S502, the CPU 101 generates a video signal of the explanation screen 410 illustrated in FIG. 4A to display the explanation screen 410 on the display panel on the operation unit 130. Accordingly, in step S502, when the user presses the OK button 411 on the explanation screen 410, the CPU 101 generates a video signal of the IPP driver use selection screen 420 illustrated in FIG. 4B to display the IPP driver use selection screen 420 on the display panel. Subsequently, in step S503, when either one of the items 421 and 422 on the IPP driver use selection screen 420 is selected by the user, the CPU 101 receives the selection result. Then, in step S504, the CPU 101 sets an initial setting completion flag corresponding to the item 421 or 422 selected by the user in step S503, and the processing proceeds to step S505.

If the initial setting completion flag has already been set (YES in step S501), or the initial setting completion flag is set in step S504, then in step S505, the CPU 101 checks an interface configuration corresponding to a setting of the set initial setting completion flag. If the setting of the initial setting completion flag indicates an interface configuration corresponding to the item "USB" 421 (YES in step S505), the processing proceeds to step S506. On the other hand, if the setting of the initial setting completion flag indicates an interface configuration corresponding to the item. "DO NOT USB" 422 (NO in step S505), the processing proceeds to step S507. In step S506, the CPU 101 determines interfaces for the vendor driver and the IPP driver as interfaces to be used, and forms the determined interfaces for the vendor driver and the IPP driver. Then, the processing proceeds to step S508. On the other hand, in step S507, the CPU 101 determines an interface for the vendor driver as an interface to be used, and forms the determined interface for only the vendor driver. Then, the processing proceeds to step S508. In step S508, the CPU 101 activates USB communication with the interfaces formed in step S506 or the interface formed in step S507. Such activation of the USB communication enables the printing apparatus 100 to communicate with the PC 150 via the USB I/F 108.

Figure 6:
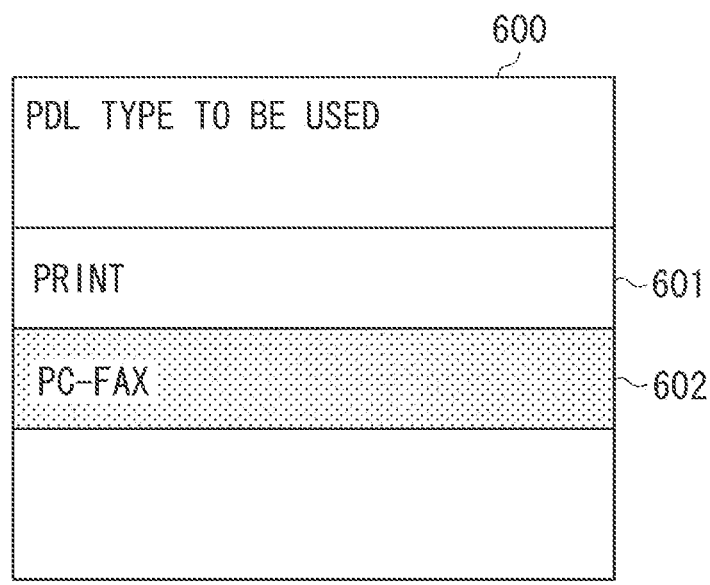
FIG. 6 is a diagram illustrating an example of a page description language (PDL) type selection screen displayed by the printing apparatus.

FIG. 6 is a diagram illustrating one example of a PDL type selection screen 600 displayed on a display panel of the operation unit 130 of the printing apparatus 100 according to the first exemplary embodiment. The PDL type selection screen 600 is displayed when the user selects a PDL type. For example, the PDL type selection screen 600 includes an item "PRINT" setting 601 and an item "PC-FAX" setting 602. The CPU 101 receives a result of selection made by the user from the PDL type selection screen. 600 via a touch panel of the operation unit 130. For example, the item. "PRINT" setting 601 may be selected. In such a case, the CPU 101 transmits a print driver device ID of the IPP driver to the PC 150 when a device ID acquisition request is issued from the PC 150 to the interface descriptor 330. On the other hand, the item "PC-FAX" setting 602 may be selected. In such a case, the CPU 101 transmits a PC-FAX driver device ID of the IPP driver to the PC 150 when a device ID acquisition request is issued from the PC 150 to the interface descriptor 330.

Hereinafter, a second exemplary embodiment is described. Unlike the first exemplary embodiment described above, the second exemplary embodiment is described using an example in which a USB driver to be used is selected by a user and a USB interface corresponding to the selected USB driver is formed. Configurations of a printing apparatus 100 and a PC 150 according to the second exemplary embodiment are substantially the same as those described above with reference to FIG. 1. In the second exemplary embodiment, a USB descriptor 200 for formation of an interface for a vendor driver is substantially the same as that described above with reference to FIG. 2, and a USB descriptor 300 for formation of interfaces for a vendor driver and a general-purpose driver is substantially the same as that described above with reference to in FIG. 3.

Each of FIGS. 7A and 7B is a diagram illustrating one example of a screen displayed on an operation unit 130 of the printing apparatus 100 according to the second exemplary embodiments when the printing apparatus 100 starts up, an initial setting may not be performed. In such a case, the CPU 101 generates a video signal of an explanation screen 710 as illustrated in FIG. 7A to display the explanation screen 710 on a display panel of the operation unit 130. The explanation screen 710 explains a setting content for an initial setting to a user. When the user touches (presses) an OK button 711 displayed on the explanation screen 710, the CPU 101 generates a video signal of a use driver selection screen 720 as illustrated in FIG. 7B to display the use driver selection screen 720 on the display panel of the operation unit 130. The use driver selection screen 720 is displayed to the user so that the user selects a driver to be used in the USB connection from a plurality of candidates. Particularly, in the example diagram illustrated in FIG. 7E, the use driver selection screen 720 includes an item "PDL driver" 721, an item "scan driver" 722, an item "FAX driver" 723, and an item "IPP driver (general-purpose driver)" 724 that are arranged with respective check boxes. When the user places a checkmark in a desired check box and touches (presses) an OK button 725 on the use driver selection screen 720, the CPU 101 sets to a driver to be used a driver corresponding to the item with the checkmark. In the example diagram illustrated in FIG. 7E, the PDL driver, the scan driver, and the IPP driver are selected. The CPU 101 forms a USB interface using USB descriptors (not illustrated) the respective selected drivers. The use driver selection screen 720 can be displayed an a user setting screen (not illustrated).

Figure 8:
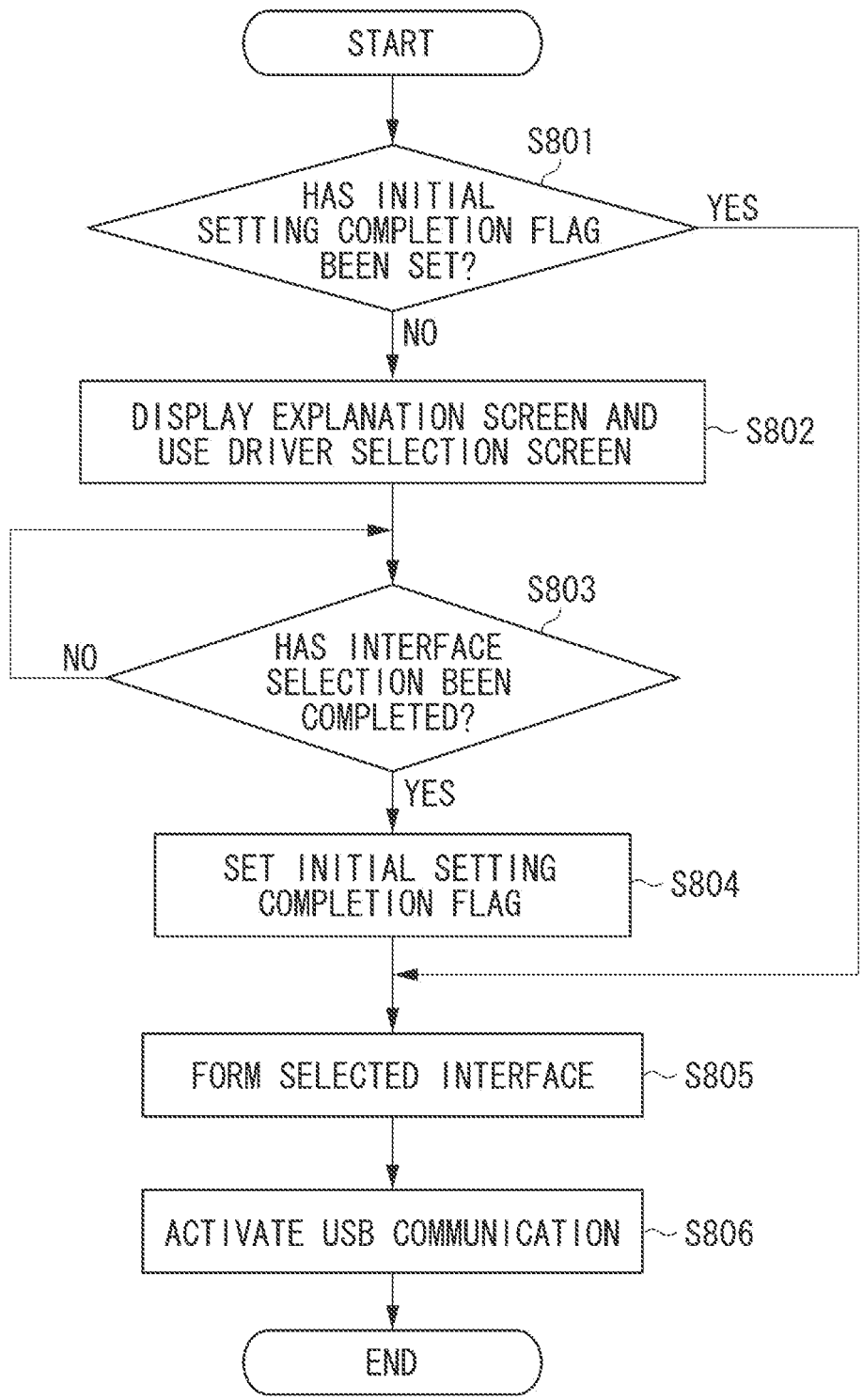
FIG. 8 is a flowchart illustrating processing performed by the printing apparatus according to the second exemplary embodiment.

FIG. 8 is a flowchart illustrating processing performed between connection of the printing apparatus 100 of the second exemplary embodiment to the PC 150 via a USB cable and activation of USB communication. A control program to be executed by the CPU 101 of the printing apparatus 100 is stored in a ROM 103. The CPU 101 loads the control program stored in the ROM 103 to a RAM 102, and executes the loaded control program to perform each of steps S801 through S806 illustrated in FIG. 8.

In step S801, when the printing apparatus 100 of the second exemplary embodiment is connected to the PC 150 via a USB cable, the CPU 101 of the printing apparatus 100 determines whether an initial setting completion flag has been set. If the CPU 101 determines that the initial setting completion flag has already been set (YES in step S801), the processing proceeds to step S805. On the other hand, if the CPU 101 determines that the initial setting completion flag has not been set (NO in step S801), the processing proceeds to step S802. In step S802, the CPU 101 displays the explanation screen 710 illustrated in FIG. 7A. When the user presses the OK button 711 on the explanation screen 710, the CPU 101 displays the use driver selection screen 720 illustrated in FIG. 7B. Then, the processing proceeds to step S803. In step S803, when any driver is selected by the user from the drivers (the items 721 through 724) on the use driver selection screen 720, the CPU 101 receives a result of the selection. Subsequently, in step S804, the CPU 101 sets an initial setting completion flag corresponding to the driver selected by the user in step S803, and the processing proceeds to step S805.

If the initial setting completion flag has already been set (YES in step S801) or the initial setting completion flag is set in step S804, then in step S805, the CPU 101 forms an interface for a driver corresponding to the setting of the initial setting completion flag. Subsequently, in step S806, the CPU 101 activates USB communication with the interface formed in step S805. This enables the printing apparatus 100 of the second exemplary embodiment to communicate with the PC 150 via a USB I/F 108.

Hereinafter, a third exemplary embodiment is described. The second exemplary embodiment has been described using an example in which the printing apparatus 100 causes a user to select a type of an OS and then forms a USB interface corresponding to a driver installed on the OS selected by the user. Configurations of a printing apparatus 100 and a PC 150 according to the third exemplary embodiment are substantially the same as those described above with reference to FIG. 1. In the third exemplary embodiment, a USB descriptor 200 for formation of an interface for a vendor driver is substantially the same as that described above with reference to FIG. 2, and a USB descriptor 300 for formation of interfaces for a vendor driver and a general-purpose driver is substantially the same as that described above with reference to FIG. 3.

Figure 9:
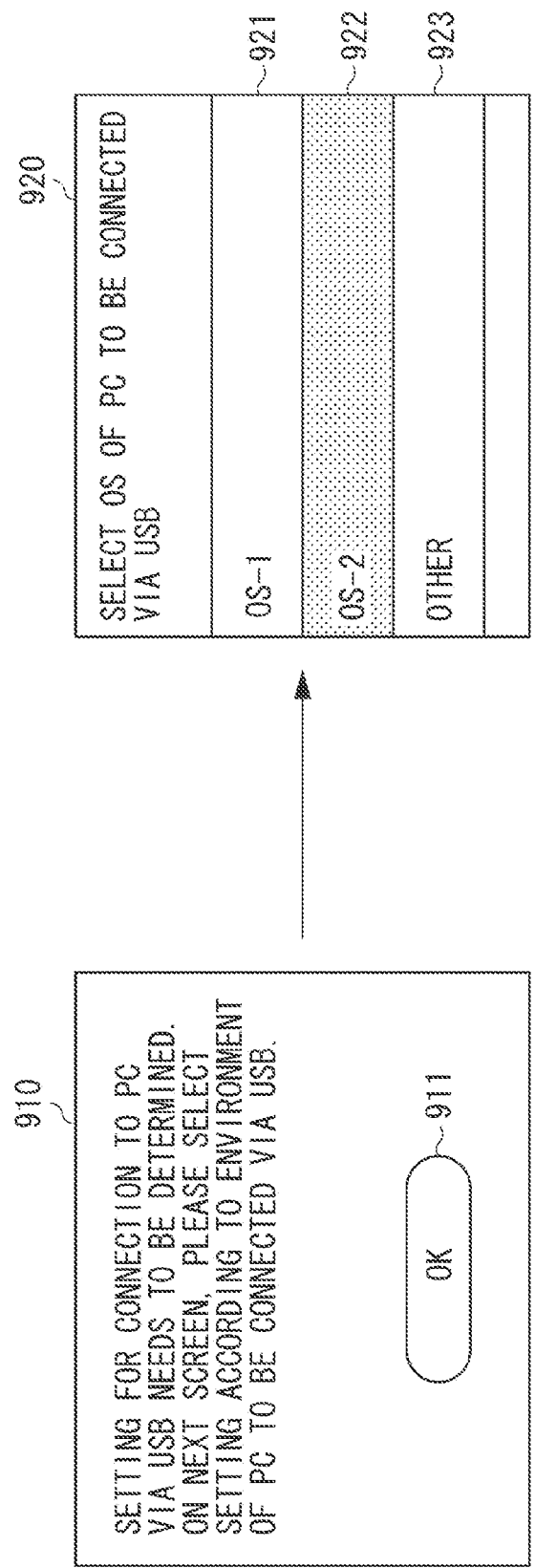
FIGS. 9A and 9B are diagrams illustrating examples screens displayed by a printing apparatus according to a third exemplary embodiment.

Each of FIGS. 9A and 9B is a diagram illustrating one example of a screen displayed by an operation unit 130 of the printing apparatus 100 according to the third exemplary embodiment. When the printing apparatus 100 starts up, an initial setting may not be performed. In such a case, the CPU 101 displays an explanation screen 910 as illustrated in FIG. 9A on a display panel of the operation unit 130. The explanation screen 910 explains a setting content for the initial setting to the user. When the user touches (presses) an OK button 911 displayed on the explanation screen 910, the CPU 101 displays a use OS selection screen 920 as illustrated in FIG. 9B on the display panel of the operation unit 130. The use OS selection screen 920 is displayed when the user selects an OS of the PC 150 to select a driver to be used in USB connection from a plurality of candidates. Particularly, in the example diagram illustrated in FIG. 9B, the use OS selection screen 920 includes an item "OS-1" 921 indicating a first OS, an item "OS-2" 922 indicating a second OS different from the first OS, and an item "other" 923 indicating an OS different from the first OS and the second OS. Herein, an IPP driver is not installed as default an each of the OS-1 and the other OS, whereas an IPP driver is installed as default on the OS-2. When the user selects any item from the items 921 through 923 illustrated in FIG. 9B, the CPU 101 forms a USB interface using a USB descriptor (not illustrated) corresponding to a driver installed on the OS corresponding to the selected item. In this example, if the item "OS-2" 922 is selected, the CPU 101 forms a USB interface using the USB descriptor 300 for formation of the interfaces for the vendor driver and the general-purpose driver illustrated in FIG. 3. On the other hand, if the item "OS-1" 921 or the item "other" 923 is selected, the CPU 101 forms a USB interface using the USB descriptor 200 for formation of the interface for only the vendor driver illustrated in FIG. 2. The use OS selection screen 920 can be displayed on a user setting screen (not illustrated).

Figure 10:
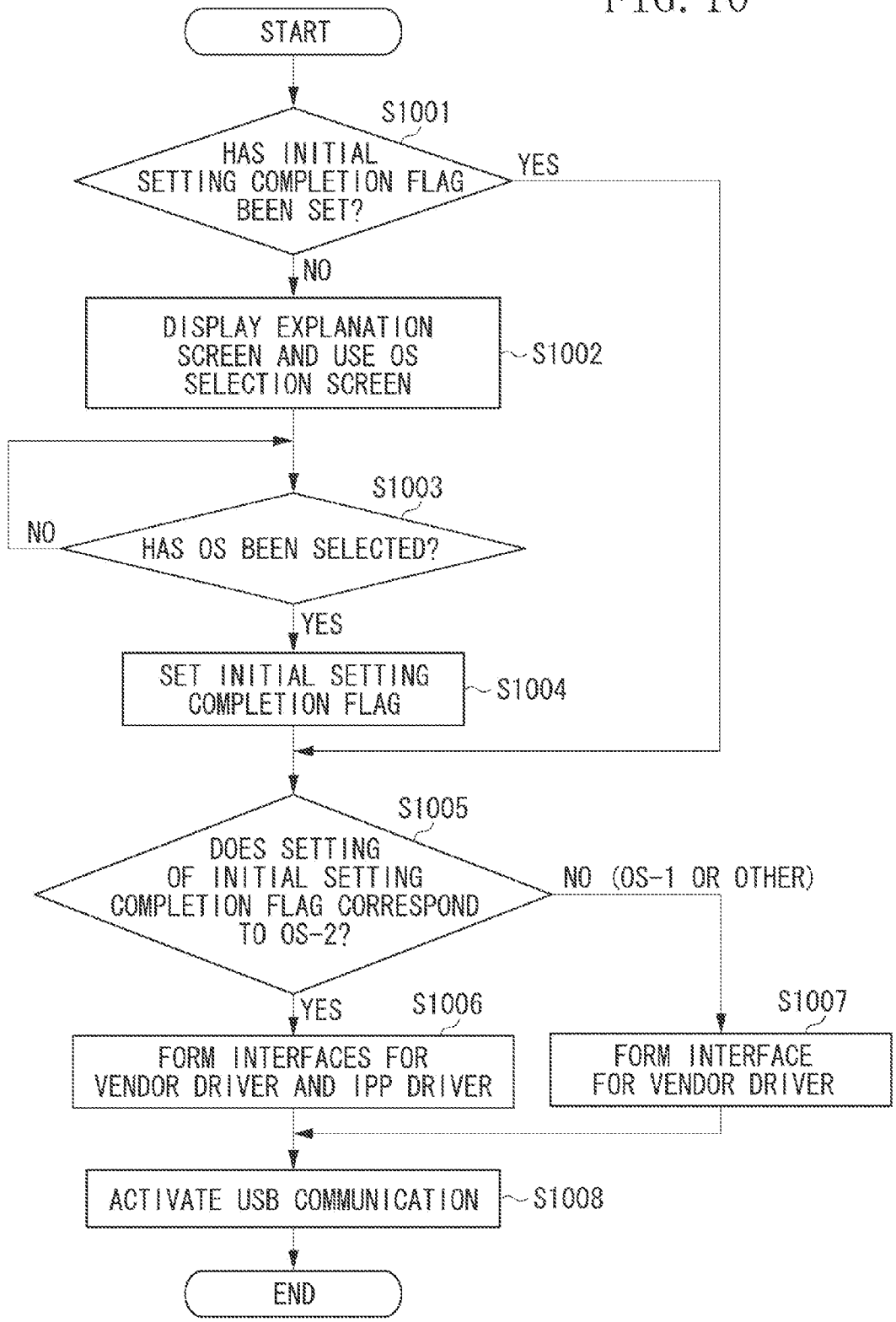
FIG. 10 is a flowchart illustrating processing performed by the printing apparatus according to the third exemplary embodiment.

FIG. 10 is a flowchart illustrating processing performed between connection of the printing apparatus 100 of the third exemplary embodiment to the PC 150 via a USB cable and activation of USB communication. A control program to be executed by the CPU 101 of the printing apparatus 100 is stored in a ROM 103. The CPU 101 loads the control program stored in the ROM 103 to a RAM 102, and executes the loaded control program to perform each of steps S1001 through S1008 illustrated in FIG. 10.

In step S1001, when the printing apparatus 100 of the third exemplary embodiment is connected to the PC 150 via a USB cable, the CPU 101 of the printing apparatus 100 determines whether an initial setting completion flag has been set. If the CPU 101 determines that the initial setting completion flag has already been set (YES in step S1001), the processing proceeds to step S1005. On the other hand, if the CPU 101 determines that the initial setting completion flag has not been set (NO in step S1001), the processing proceeds to step S1002. In step S1002, the CPU 101 displays the explanation screen 910 illustrated in FIG. 9A. When the user presses the OK button 911 on the explanation screen 910, the CPU 101 displays the use OS selection screen 920 illustrated in FIG. 9E. Then, the processing proceeds to step S1003. In step S1003, if the user selects any item from the items 921 through 923 on the use OS selection screen 920 (YES in step S1003), the CPU 101 receives a result of the selection. Then, the processing proceeds to step S1004. In step S1004, the CPU 101 sets an initial setting completion flag corresponding to the item 921, 922, or 923 selected by the user in step S1003, and the processing proceeds to step S1005.

If the initial setting completion flag has already been set (YES in step S1001) or the initial setting completion flag is set in step S1004, then in step S1005, the CPU 101 checks an interface configuration corresponding to a setting of the set initial setting completion flag. If the CPU 101 determines that the setting of the initial setting completion flag indicates an interface configuration corresponding to the item "OS-2" 922 (YES in step S1005), the processing proceeds to step S1006. On the other hand, if the CPU 101 determines that the setting of the initial setting completion flag indicates an interface configuration corresponding to the item "OS-1" 921 or the item "other" 923 (NO (OS-1 OR OTHER) in step S1005), the processing proceeds to step S1007. In step S1006, the CPU 101 forms interfaces for a vendor driver and an IPP driver, and the processing proceeds to step S1008. On the other hand, in step S1007, the CPU 101 forms an interface for only a vendor driver, and the processing proceeds to step S1008. In step S1008, the CPU 101 activates USB communication with the interfaces formed in step S1006 or the interface formed in step S1007. Thus, the activation of the USB communication enables the printing apparatus 100 to communicate with the PC 150 via a USB I/F 108.

According to each of the first through third exemplary embodiments, a USB interface is formed according to a user setting, and USB communication can be activated after an initial setting is performed. This can prevent a driver installation failure even when the printing apparatus 100 including an interface for an IPP driver is connected to the PC 150 in which an OS without an IPP driver is in operation. That is, according to each of the first through third exemplary embodiments, an interface to be used when a printing apparatus and an information processing apparatus communicate with each other can be formed regardless of whether a general-purpose device driver is installed an OS.

Hereinafter, a fourth exemplary embodiment is described. The fourth exemplary embodiment is described using an example in which a USB interface is dynamically formed when a printing apparatus 100 and a PC 150 are connected, instead of formation of a USB interface based on selection made by a user as the first through third exemplary embodiments. In the fourth exemplary embodiment, IPP over USB is described as an example of a general-purpose driver. Configurations of the printing apparatus 100 and the PC 150 of the fourth exemplary embodiment are substantially the same as those described above with reference to FIG. 1.

Figure 11:
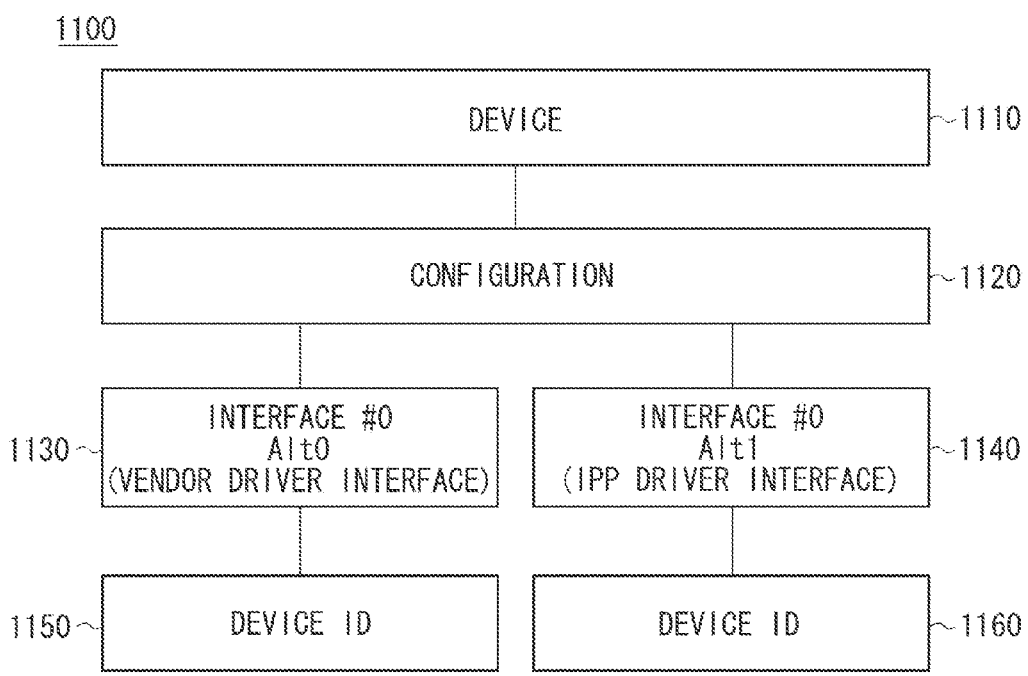
FIG. 11 is a diagram illustrating a descriptor for a single interface according to a fourth exemplary embodiment.

FIG. 11 is a diagram illustrating an example of a USB descriptor 1100 retained by the printing apparatus 100 of the fourth exemplary embodiment for interfaces that can be formed in a mutually exclusive manner. In FIG. 11, the USB descriptor 1100 includes a device descriptor 1110, a configuration descriptor 1120, and interface descriptors 1130 and 1140. The device descriptor 1110 is used for notification of a vendor ID and a product ID. The configuration descriptor 1120 is used for notification of an interface configuration selectable by the printing apparatus 100. The interface descriptor 1130 serves as a descriptor of an interface communicable with a vendor driver. The interface descriptor 1130 indicates an alternate setting "0" of an interface #0 in a USB. The interface descriptor 1140 serves as a descriptor of an interface (hereinafter referred to as an IPP driver interface) communicable with an IPP driver. The interface descriptor 1140 indicates an alternate setting "1" of the interface #0 in the USB. In the fourth exemplary embodiment, the printing apparatus 100 performs communication using the alternate setting "0" or "1" of the interface designated by an alternate setting request from the PC 150. Moreover, in FIG. 11, each piece of device ID 1150 and 1160 identifies a device defined by IEEE 1284. When the printing apparatus 100 including the USB descriptor 1100 is connected to the PC 150, the PC 150 recognizes the printing apparatus 100 as an apparatus including a single interface.

Figure 12:
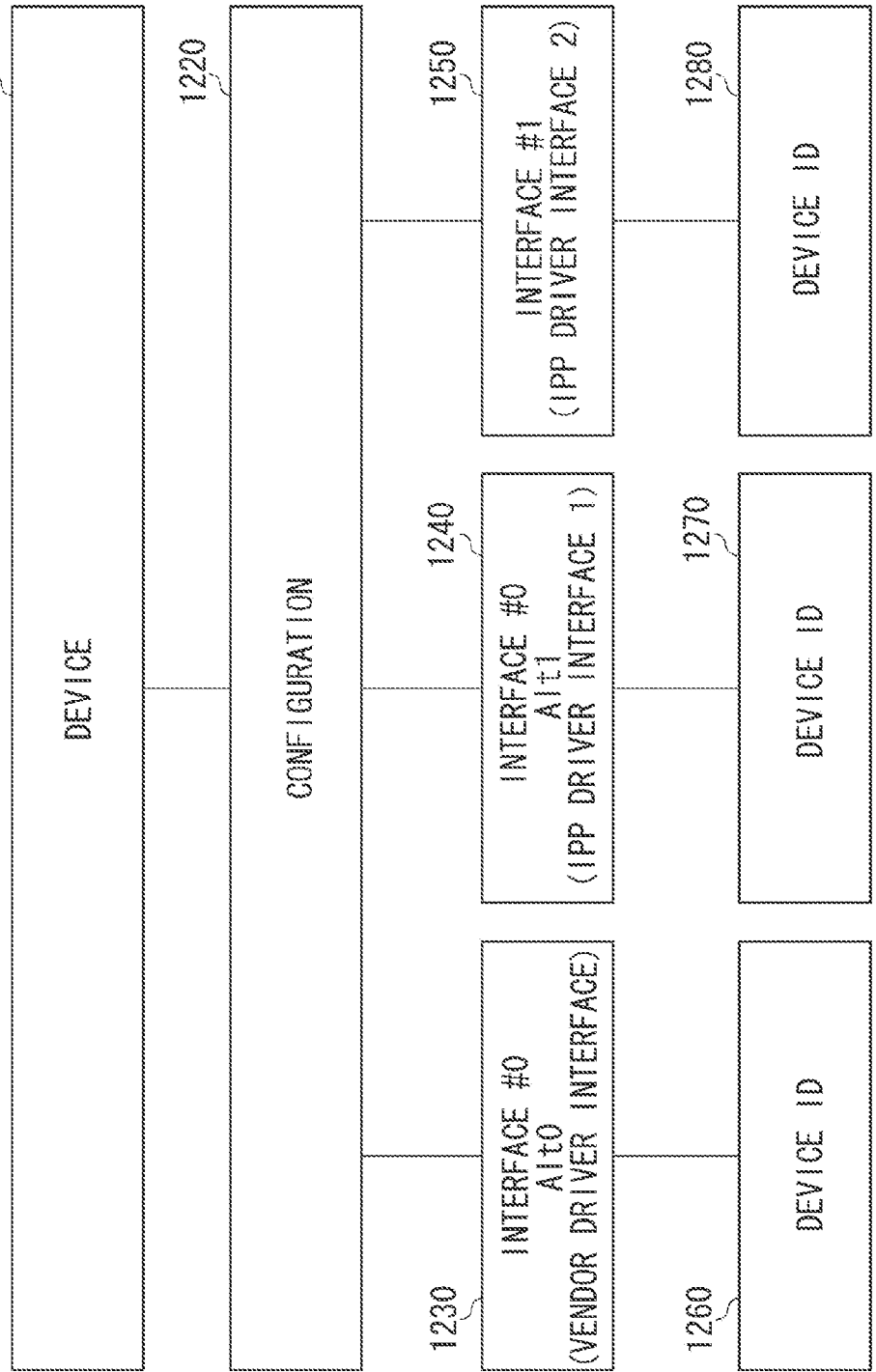
FIG. 12 is a diagram illustrating a descriptor for a plurality of interfaces according to the fourth exemplary embodiment.

FIG. 12 is a diagram illustrating one example of a USB descriptor 1200 retained by the printing apparatus 100 according to the fourth exemplary embodiment for interfaces that can be formed in a mutually exclusive manner and a single interface. In FIG. 12, the USB descriptor 1200 includes a device descriptor 1210, a configuration descriptor 1220, and interface descriptors 1230, 1240, and 1250. The device descriptor 1210 is used for notification of a vendor ID and a product ID. The configuration descriptor 1220 is used for notification of an interface configuration selectable by the printing apparatus 100. The interface descriptor 1230 indicates an alternate setting "0" of an interface #0. The interface descriptor 1240 serves as a descriptor of an interface (an IPP driver interface) communicable with an IPP driver. The interface descriptor 1240 indicates an alternate setting "1" of the interface #0. The printing apparatus 100 performs communication using the alternate setting "0" or "1" of the interface designated by an alternate setting request from the PC 150. The interface descriptor 1250 serves as a descriptor of an interface (an IPP driver interface) communicable with an IPP driver. Moreover, in FIG. 12, each of a device ID 1260, a device ID 1270, and a device ID 1280 identifies a device defined by IEEE 1284. When the printing apparatus 100 including the USB descriptor 1200 is connected to the PC 150, the PC 150 recognizes the printing apparatus 100 as an apparatus (the aforementioned composite USB) including a plurality of interfaces.

Figure 13B:
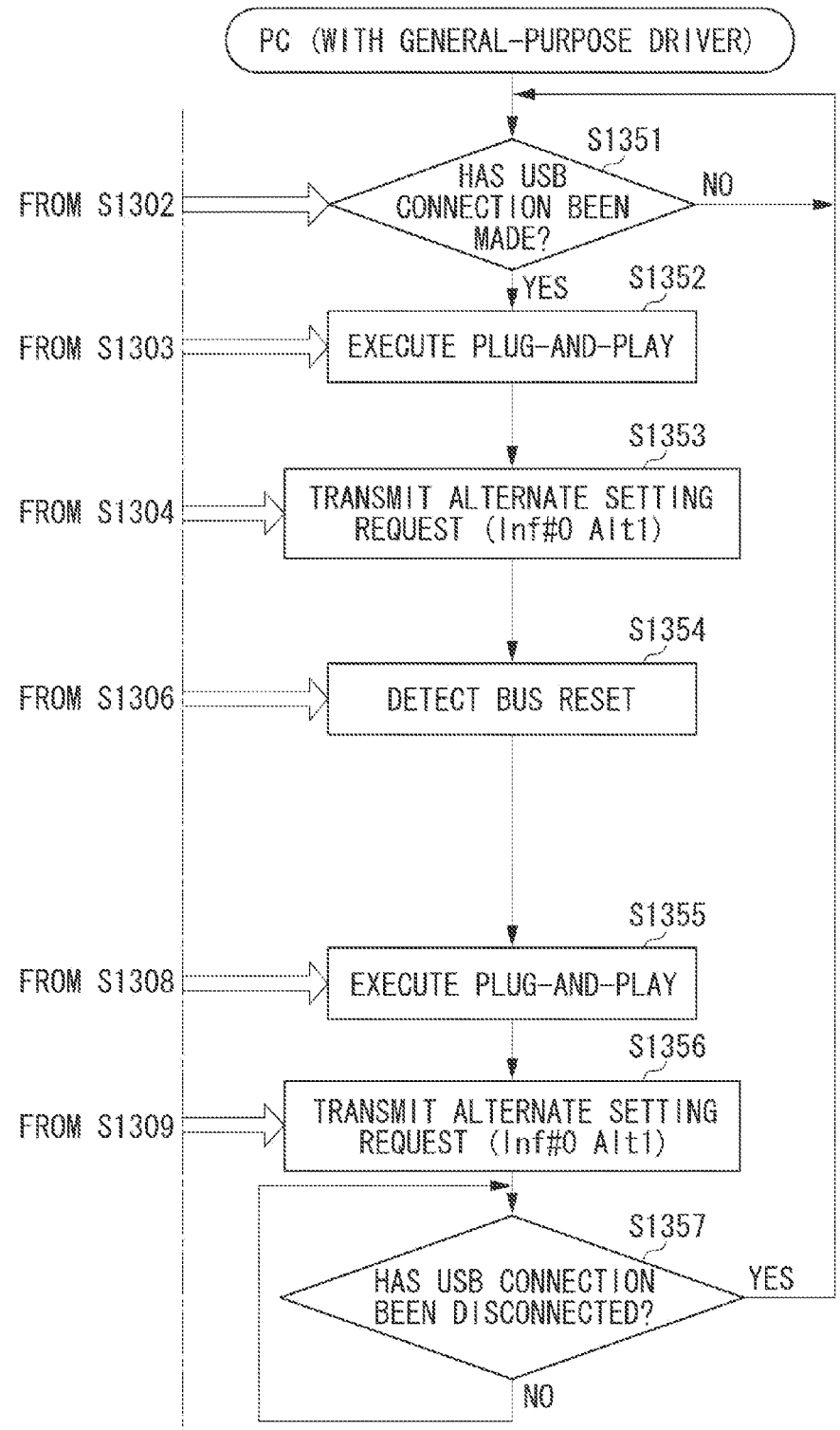
FIG. 13, composed of FIGS. 13A and 13B, is a flowchart illustrating an example of processing in a case where an operating system (OS) with a general-purpose driver is used in the fourth exemplary embodiment.

FIG. 13 is a flowchart illustrating an example of processing performed in a case where USB connection is made between the printing apparatus 100 of the fourth exemplary embodiment and the PC 150 in which an OS with an IPP driver is in operation. FIG. 13A is a flowchart illustrating processing performed by the printing apparatus 100, whereas FIG. 13B is a flowchart illustrating processing performed by the PC 150 in which the OS with the IPP driver is in operation. A control program to be executed by a CPU 101 of the printing apparatus 100 is stored in a ROM 103. The CPU 101 loads the control program stored in the ROM 103 to a. RAM 102, and executes the loaded control program to perform each of steps S1301 through S1311 illustrated in FIG. 13A. On the other hand, a control program to be executed by a CPU 152 of the PC 150 is stored in an HDD 154. The CPU 152 loads the control program stored in the HDD 154 to a RAM 153, and executes the loaded control program to perform each of steps S1351 through S1357 illustrated in FIG. 13B.

First, the processing performed by execution of the control program by the CPU 101 of the printing apparatus 100 is described with reference to the flowchart illustrated in FIG. 13A. In step S1301, the CPU 101 of the printing apparatus 100 of the fourth exemplary embodiment forms a single interface using the USB descriptor 1100 illustrated in FIG. 11 as an initial setting. Subsequently, in step S1302, the CPU 101 awaits connection of the printing apparatus 100 to the PC 150 via a USB I/F 108. If the CPU 101 determines that the USB connection has not been made to the PC 150 (NO in step S1302), the processing returns to step S1301. If the CPU 101 determines that the USB connection has been made to the PC 150 (YES in step S1302), the processing proceeds to step S1303. In step S1303, the CPU 101 executes Plug-and-Play to provide the USB descriptor 1100 illustrated in FIG. 11 to the PC 150. Then, the processing proceeds to step S1304.

In step S1304, the CPU 101 awaits an alternate setting request for an alternate setting "1" of the interface #0 from the PC 150. If the CPU 101 determines that the alternate setting request for the alternate setting "1" of the interface #0 has not been received from the PC 150 (NO in step S1304), the processing proceeds to step S1305. In step S1305, the CPU 101 determines whether the USB connection between the printing apparatus 100 and the PC 150 has been disconnected. If the CPU 101 determines that the USB connection has been disconnected (YES in step S1305), the processing returns to step S1301. On the other hand, if the CPU 101 determines that the USB connection has not been disconnected (NO in step S1305), the processing returns to step S1304. If the CPU 101 determines that the alternate setting request for the alternate setting "1" of the interface #0 has been received from the PC 150 (YES in step S1304), the processing proceeds to step S1306. In step S1306, the CPU 101 issues a bus reset to initialize the communication. In one example as the specific bus reset, control is performed such that a D+ signal wire of a USB that is normally pulled up is temporarily stopped when the bus reset is issued. After the bus reset is issued in step S1306, the processing proceeds to step S1307.

In step S1307, the CPU 101 forms a plurality of interfaces using the USB descriptor 1200 illustrated in FIG. 12. Subsequently, in step S1308, the CPU 101 executes Plug-and-Play to provide the USB descriptor 1200 illustrated in FIG. 12 to the PC 150. Then, in step S1309, the CPU 101 awaits an alternate setting request for the interface #0 from the PC 150. If the CPU 101 determines that the alternate setting request for the interface #0 has been received from the PC 150 (YES in step S1309), the processing proceeds to step S1310. If the CPU 101 determines that the alternate setting request has not been received (NO in step S1309), the processing proceeds to step S1311. In step S1310, the CPU 101 activates the interface having the alternate setting (the interface descriptor 1230 or 1240 illustrated in FIG. 12) received in step S1309. Subsequently, in step S1311, the CPU 101 determines whether the USB connection has been disconnected. If the CPU 101 determines that the USB connection has been disconnected (YES in step S1311), the processing returns to step S1301. On the other hand, if the CPU 101 determines that the USB connection has not been disconnected (NO in step S1311), the processing returns to step S1309.

Next, the processing performed by execution of the control program by the CPU 152 of the PC 150 according to the fourth exemplary embodiment is described with reference to the flowchart illustrated in FIG. 13E. In step S1351, the CPU 152 of the PC 150 awaits connection of the PC 150 to the printing apparatus 100 via a USB I/F 155. If the CPU 152 determines that the USB connection has not been made to the printing apparatus 100 (NO in step S1351), the CPU 152 repeats the processing in step S1351. If the CPU 152 determines that the USB connection has been made to the printing apparatus 100 (YES in step S1351), the processing proceeds to step S1352. In step S1352, the CPU 152 executes Plug-and-Play to receive the USB descriptor 1100 illustrated in FIG. 11 from the printing apparatus 100, and the processing proceeds to step S1353.

In step S1353, the CPU 152 transmits an alternate setting request for an alternate setting "1" of the interface #0 to the printing apparatus 100. Subsequently, in step S1354, the CPU 152 detects the bus reset issued by the printing apparatus 100 in step S1306. Then, in step S1355, the CPU 152 executes Plug-and-Play to receive the USB descriptor 1200, which is illustrated in FIG. 12 and activated by the printing apparatus 100 in step S1308. In step S1356, the CPU 152 transmits the alternate setting request for the alternate setting "1" of the interface #0 to the printing apparatus 100. Subsequently, in step S1357, the CPU 152 determines whether the USB connection has been disconnected. If the CPU 152 determines that the USB connection has been disconnected (YES in step S1357), the processing returns to step S1351. If the CPU 152 determines that the USB connection has not been disconnected (NO in step S1357), the CPU 152 repeats the processing in step S1357.

Figure 14B:
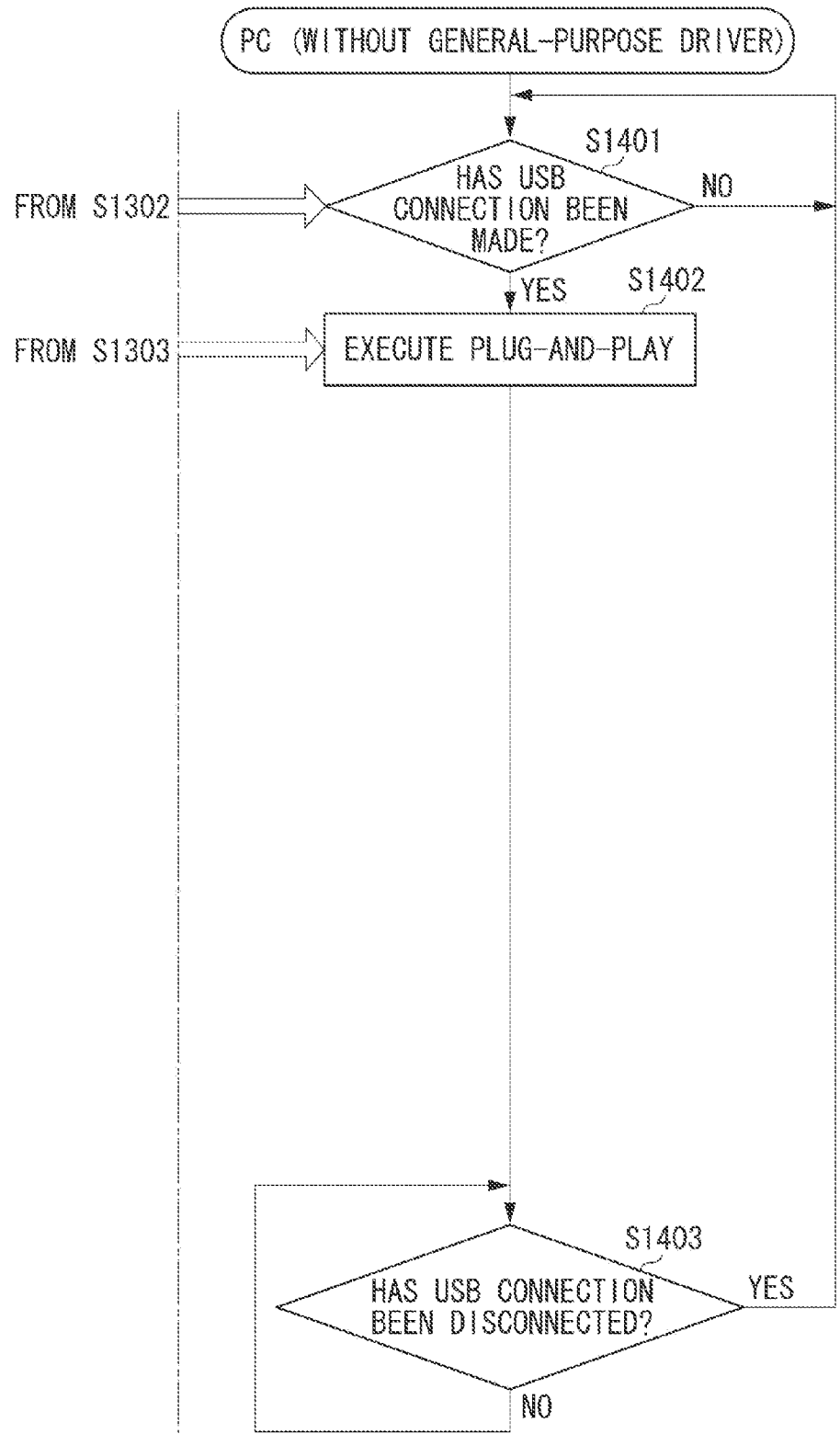
FIG. 14, composed of FIGS. 14A and 14B, is a flowchart illustrating an example of processing in a case where an OS without a general-purpose driver is used in the fourth exemplary embodiment.

FIG. 14 is a flowchart illustrating an example of processing performed in a case where USB connection is made between the printing apparatus 100 of the fourth exemplary embodiment and the PC 150 in which an OS without an IPP driver is in operation. FIG. 14A is a flowchart illustrating the processing performed by the printing apparatus 100, whereas FIG. 14B is a flowchart illustrating the processing performed by the PC 150 in which the OS without the IPP driver is in operation. A control program to be executed by the CPU 101 of the printing apparatus 100 is stored in the ROM 103. Since each processing in steps S1301 through S1311 illustrated in FIG. 14A is substantially the same as that in steps S1301 through 1311 illustrated in FIG. 13A, description thereof is omitted. A control program to be executed by the CPU 152 of the PC 150 is stored in the HDD 154. The CPU 152 loads the control program stored in the HDD 154 to the RAM 153, and executes the loaded control program to perform each of steps S1401 through S1403 illustrated in FIG. 14B.

Hereinafter, the processing performed by execution of the control program by the CPU 152 of the PC 150 is described with reference to the flowchart illustrated in FIG. 14E. In step S1401, the CPU 152 of the PC 150 in which the OS without the IPP driver is in operation awaits connection of the PC 150 to the printing apparatus 100 via a USB I/F 155. If the CPU 152 determines that the USB connection has not been made to the printing apparatus 100 (NO in step S1401), the CPU 152 repeats the processing in step S1401. If the CPU 152 determines that the USB connection has been made to the printing apparatus 100 (YES in step S1401), the processing proceeds to step S1402. In step S1402, the CPU 152 executes Plug-and-Play to receive the USB descriptor 1100 illustrated in FIG. 11 from the printing apparatus 100. Subsequently, in step S1403, the CPU 152 determines whether the USB connection has been disconnected. If the CPU 152 determines that the USB connection has been disconnected (YES in step S1403), the processing returns to step S1401. If the CPU 152 determines that the USB connection has not been disconnected (NO in step S1403), the CPU 152 repeats the processing in step S1403.

When the PC 150 in which the OS without the IPP driver is in operation is used as illustrated in FIG. 14E, the CPU 152 does not perform the processing as described in step S1353 illustrated in FIG. 13B in which the alternate setting request for the alternate setting "1" of the interface #0 is transmitted to the printing apparatus 100. Accordingly, in step S1304, the CPU 101 of the printing apparatus 100 determines that the alternate setting request for the alternate setting "1" of the interface #0 has not been received from the PC 150. Then, the processing proceeds to step S1305, and the processing from steps S1306 through S1311 is not executed. That is, in the flowchart illustrated in FIG. 14E, the printing apparatus 100 does not change the USB descriptor 1100 for formation of a single interface to the USB descriptor 1200 for formation of a plurality of interfaces.

Figure 15:
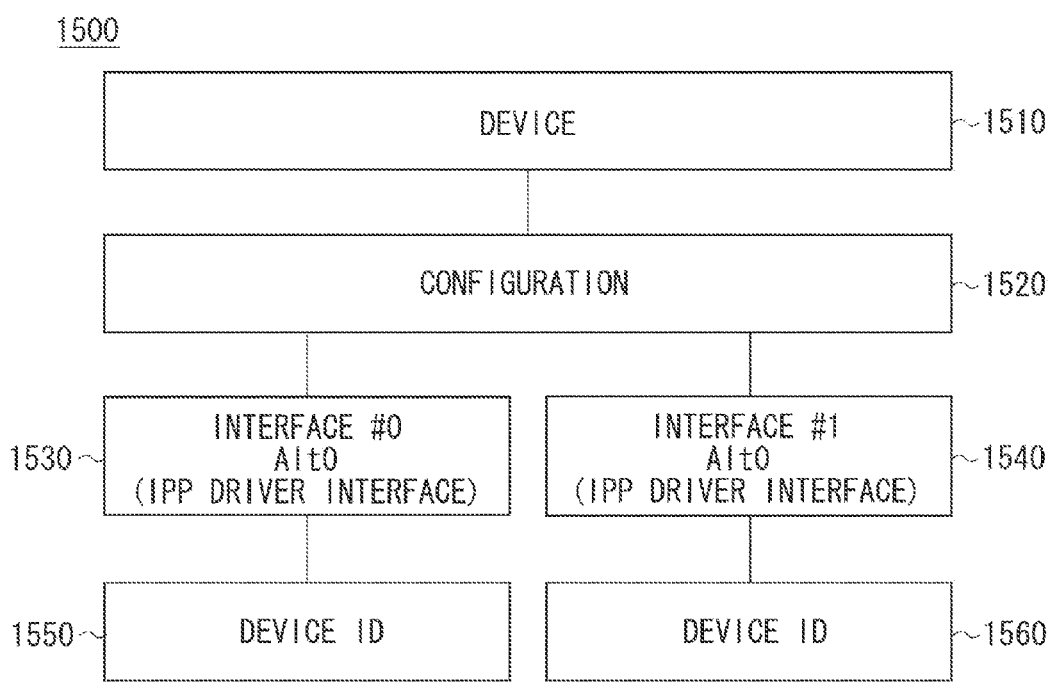
FIG. 15 is a diagram illustrating an example of another universal serial bus (USB) descriptor according to the fourth exemplary embodiment.

FIG. 15 is a diagram illustrating one example a USB descriptor 1500 retained by the printing apparatus 100 of the fourth exemplary embodiment in the example processing in FIGS. 14A and 14E for interfaces that can be formed in a mutually exclusive manner and a single interface. In FIG. 15, each of interface descriptors 1530 and 1540 serves as a descriptor of an interface (an IPP driver interface) communicable with an IPP driver. In FIG. 15, each of a device ID 1550 and a device ID 1560 identifies a device defined by IEEE 1284. When the printing apparatus 100 including the USB descriptor 1500 is connected to the PC 150, the PC 150 recognizes the printing apparatus 100 as an apparatus (the aforementioned composite USB) including a plurality of interfaces.

In the aforementioned processing in step S1307, a plurality of interfaces can be formed using the USB descriptor 1500 illustrated in FIG. 15.

According to the fourth exemplary embodiment, a USB interface is dynamically formed when the printing apparatus 100 and the PC 150 are connected, so that USB communication can be performed. This can prevent a driver installation failure even when the printing apparatus 100 including an interface for an IPP driver is connected to the PC 150 in which an OS without an IPP driver is operation. That is, according to the fourth exemplary embodiment, an interface used when the printing apparatus and the information processing apparatus communicate with each other can be formed regardless of whether a general-purpose device driver is installed on the OS.

The present invention has been described in detail with reference to specific exemplary embodiments, but is not limited thereto. Various modifications and alternative forms are possible within the scope of the following claims.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-238782, filed Dec. 7, 2015, which is hereby incorporated by reference herein in its entirety.

What is claimed is:

1. A printing apparatus comprising:
a printer;
a USB interface;
a memory configured to store instructions; and
a processor configured to execute the instructions to
display a selection screen on which a user selects an operating system (OS) type of an information processing apparatus that communicates with the printing apparatus via the USB interface,
and to determine an interface configuration of the USB interface based on the OS type selected on the selection screen, wherein in a case where the selected OS type is a predetermined type, it is determined to configure plural interfaces including an interface for Internet Printing Protocol (IPP) and an interface for a service which is different from the IPP, and in a case where the selected OS type is not the predetermined type, it is determined to configure an interface for a service not including the IPP.

2. The printing apparatus according to claim 1, wherein, when the printing apparatus starts up, the processor displays the selection screen.

3. The printing apparatus according to claim 1, wherein, when the printing apparatus starts up, the processor determines whether the interface configuration has been determined, and
wherein, in a case where the processor determines that the interface configuration has not been determined, the processor displays the selection screen.

4. The printing apparatus according to claim 1, wherein, in a case where the user selects a specific type of the OS using the selection screen, the processor determines a configuration corresponding to an IPP driver as the interface configuration.

5. A control method for a printing apparatus including a USB interface, the control method comprising:
   displaying a selection screen on which a user selects an operating system (OS) type of an information processing apparatus that communicates with the printing apparatus via the USB interface; and
   determining an interface configuration of the USB interface based on the OS type selected on the selection screen, wherein in a case where the selected OS type is a predetermined type, it is determined to configure plural interfaces including an interface for Internet Printing Protocol (IPP) and an interface for a service which is different from the IPP, and in a case where the selected OS type is not the predetermined type, it is determined to configure an interface for a service not including the IPP.

6. The control method according to claim 5, wherein, when the printing apparatus starts up, the selection screen is displayed.

7. The control method according to claim 5, wherein, when the printing apparatus starts up, it is determined whether the interface configuration has been determined, and wherein, in a case where it is determined that the interface configuration has not been determined, the selection screen is displayed.

8. A printing apparatus comprising:
   a printer;
   a USB interface;
   a memory configured to store instructions; and
   a processor configured to execute the instructions to identify an operating system (OS) type of an information processing apparatus that communicates with the printing apparatus via the USB interface,
   and to control an interface configuration of the USB interface based on the identified OS type, wherein in a case where the identified OS type is a predetermined type, the processor controls configuring plural interfaces including an interface for Internet Printing Protocol (IPP) and an interface for a service which is different from the IPP, and in a case where the identified OS type is not the predetermined type, the processor controls configuring an interface for a service not including the IPP.

* * * * *